Patented Mar. 12, 1946

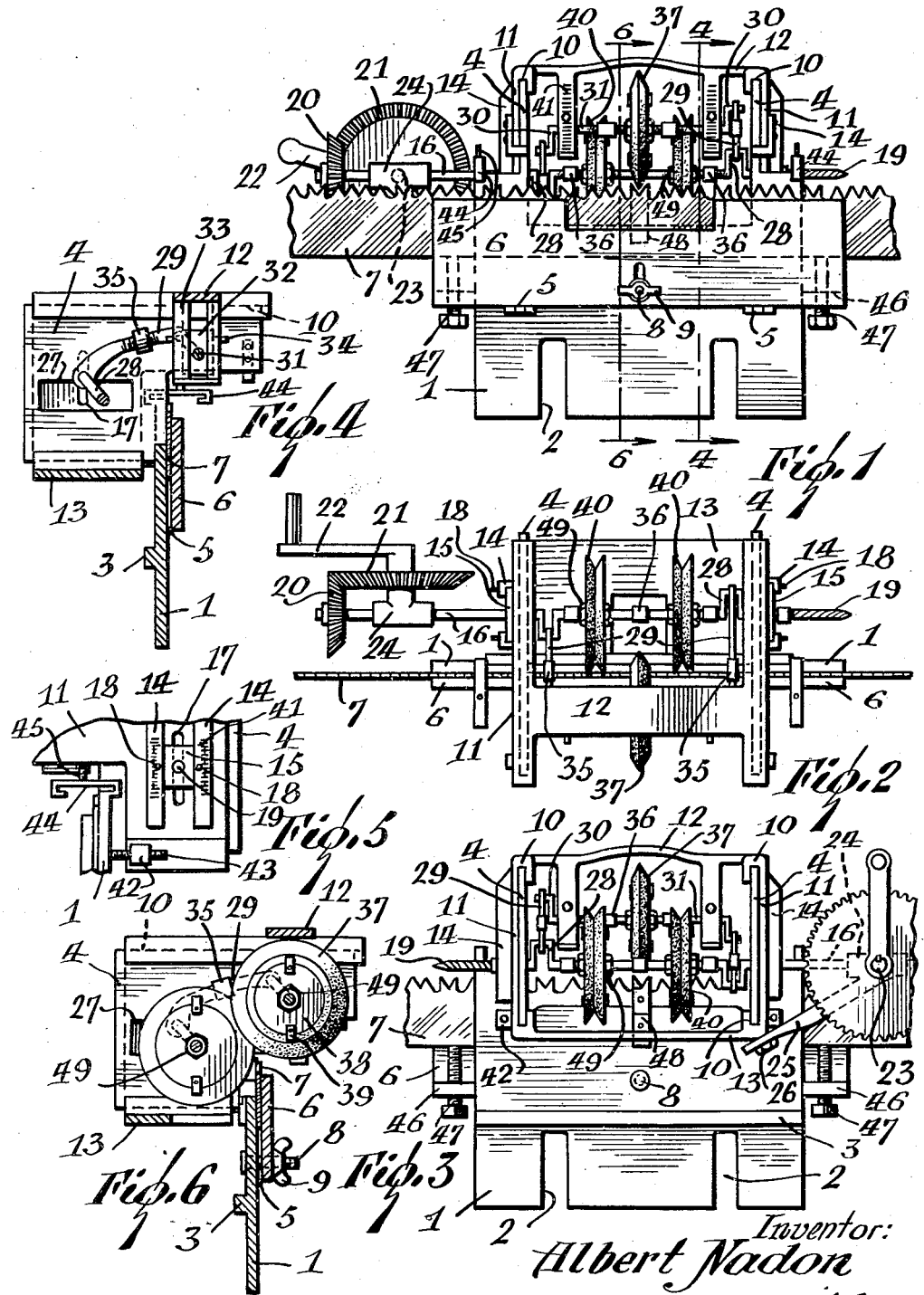

2,396,597

UNITED STATES PATENT OFFICE 2,396,597

SAW SETTING MACHINE

Albert Nadon, Fiedmond, Barraute, Abitibi, Quebec, Canada

Application December 8, 1943, Serial No. 513,393
In Canada December 30, 1942

1 Claim. (Cl. 76—37)

The present invention pertains to a novel machine for setting saws, several teeth at a time.

The principal object of the invention is to provide a machine capable of setting various kinds of saw teeth and in a rapid and efficient manner.

Another object is to provide such a machine capable of various adjustments and of utilizing one or several grinding wheels for sharpening the saw teeth.

Still another object of the invention is to provide a saw setting machine capable of piercing the ends of the saw blades.

In the accomplishment of these objects the invention comprises a frame which can be supported in a vise or in a slit formed in a block or on any stationary object. On the frame is mounted a carriage carrying grinding wheels and cranks for turning them. To the frame is secured the blade of the saw the teeth of which are to be set. The position of the blade on the frame is adjustable, and likewise the grinding wheels on the carriage are adjustable in position to sharpen one or several teeth simultaneously.

One of the shafts on the carriage for the grinding wheels is formed at one end with a drill to pierce the ends of the saw blades. These shafts are made in sections and the grinding wheels are in ring form in order to be replaced when necessary.

The invention is fully disclosed by way of example in the following description and in the accompanying drawing in which:

Figure 1 is a side elevation of the device;
Figure 2 is a plan view;
Figure 3 is an end view;
Figure 4 is a section on the line 4—4 of Figure 1;
Figure 5 is a fragmentary side view, and
Figure 6 is a section on the line 6—6 of Figure 1.

Reference to these views will now be made by use of like characters which are employed to designate corresponding parts throughout.

The machine includes a frame 1 formed of a metal plate having two notches 2 at the bottom for attachment to a suitable support. On the frame is formed a horizontal rib 3 for levelling against a fixed object or for limiting the displacement of the frame downwardly. At right angle, the upper edge of the frame 1 is formed with two side plates 4 lying in vertical planes and spaced apart. Along the horizontal center of the frame are mounted two hinges 5 pivotally supporting an elongated plate 6 for holding the saw 7 in position to be set when the plate is clamped by a screw 8 and wing nut 9.

The frame 1 receives a carriage that slides on the plates 4. The carriage further includes four channels 10 slidable on the upper and lower edges of the plates 4. The channels are united vertically by walls 11, at the bottom by a strip 12, and at the top by a horizontal plate 13. At the outer edges of the members 11 are fixed two vertical guides 14 as shown more clearly in Figure 5. In each of these guides 14 is mounted a slide 15 receiving a horizontal shaft 16 which moves vertically in a slot 17 formed in the wall 11. In order to fix the slides 15, set screws 18 passing through the guides 14 are tightened.

The shaft 16 carries at one end a drill 19 and at the other end a pinion 20 meshing with a gear 21 fixed on a crank 22. The shaft 23 of the gear end of the crank is mounted on a sleeve 24 integral with a rod 25 adjustable relatively to the carriage by a screw 26.

The shaft 16 crosses the plates 4 at slots 27 and is formed near the plates with opposed cranks 28 to which are attached rods 29 connected to cranks 30 formed at both ends of another horizontal shaft 31. The latter is also adjustable vertically by being mounted in blocks 32 slidable in guides 33 integral with the strip 12. Set screws 34 lock the blocks in the guides 33. The rods 29 are adjustable lengthwise by being formed in two parts joined by a turnbuckle 35. The shafts 16 and 31 are likewise formed in several sections joined end to end by sleeves 36 for the assembly and removal of the grinding wheels that set the saw teeth.

The shaft 31 carries a grinding wheel 37 of convex V-section at the periphery and held in place on a disk 38 keyed to the shaft 31, by pivoted clips 39. The shaft 16 receives two grinding wheels 40 of concave V-section secured in the same manner as the wheel 37 and at opposite sides thereof. The grinding wheels are preferably ring-shaped for replacement when necessary.

The members 12 and 13 carry graduations 41 near the set screws 18 and 34 for accurate adjustment of the adjustable parts. The carriage is also adjustable on the frame, as shown in Figure 5, by a sleeve 42 fixed on the plate 11 and receiving an adjustment screw 43 fastened on the rear of the frame. The two upper corners of the frame 1 are extended horizontally forward in the form of two guides 44 receiving the ends of a file (not shown) fixed thereto by screws 45. The lower corners of the plate 6 are provided with horizontal tongues 46 receiving adjustable screws 47 for levelling the blade of the saw 7. Finally at the upper central part of the frame 1 is fixed a V-shaped tooth form 48 comprised of two relatively adjustable parts and serving as a guide in setting the "raker" teeth of the saw.

In the use of the invention, the saw blade 7 is placed between the plate 6 and frame 1 and is secured in place by the screw 8 and nut 9 after the frame itself has been mounted on a bench or other support. The saw teeth lie below the guides 44 in which slides a file for equalizing the length of the teeth. By means of the guides 14 and 33 the height of the wheels 40 and 37 is adjusted and set by the screws 18 and 34. The wheels 40 and 37 are also adjusted laterally on their shafts by lock nuts 49 on the shafts. The distance between the shafts 16 and 31 is adjusted by the turnbuckles 35 in the links 29. The crank 22 is then turned, and several teeth are set simultaneously. The number of grinding wheels may be varied, and these may be changed by removing the sleeves 36. The crank 22, if desired, may be replaced by a gear and driven by a motor. The wheel 37 has a different shape than the wheels 4 and is thus adapted to grind intermediate teeth of different shape. It can also be adjusted for the elevation of said intermediate teeth.

Although a specific embodiment of the invention has been illustrated and described, it will be understood that various alterations in the details of construction may be made without departing from the scope of the invention as indicated by the appended claim.

What I claim as my invention is:

A saw setting device comprising a frame adapted for attachment to a stationary support, a clamping plate carried by said frame and adapted to support a saw, a carriage adjustably mounted on said frame, slides mounted over slots formed on said carriage, two cranked shafts mounted on said slides, grinding wheels attached to said shafts, rods connecting the cranks of said shafts, turnbuckles in said rods, means for rotating said shafts, said slides being adjustable in order to determine particular position of said shafts.

ALBERT NADON.